United States Patent
Akatsuka et al.

(10) Patent No.: US 12,391,783 B2
(45) Date of Patent: Aug. 19, 2025

(54) POLYMER COMPOUND, AND RESIN COMPOSITION CONTAINING SAID COMPOUND

(71) Applicant: Nippon Kayaku Kabushiki Kaisha, Tokyo (JP)

(72) Inventors: Yasumasa Akatsuka, Tokyo (JP); Shigeo Hayashimoto, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 489 days.

(21) Appl. No.: 18/014,902

(22) PCT Filed: Jun. 30, 2021

(86) PCT No.: PCT/JP2021/024697
§ 371 (c)(1),
(2) Date: Jan. 6, 2023

(87) PCT Pub. No.: WO2022/009744
PCT Pub. Date: Jan. 13, 2022

(65) Prior Publication Data
US 2023/0250209 A1  Aug. 10, 2023

(30) Foreign Application Priority Data
Jul. 9, 2020  (JP) .................. 2020-118416

(51) Int. Cl.
*C08F 279/00* (2006.01)
*C09J 151/00* (2006.01)

(52) U.S. Cl.
CPC ......... *C08F 279/00* (2013.01); *C09J 151/003* (2013.01)

(58) Field of Classification Search
CPC ............... C09J 151/003; C09J 2425/00; C09J 2433/00; C08J 5/18; C08F 8/14; C08F 212/08; C08F 220/08; C08F 226/06; C08F 290/126; C08F 222/14; C08F 220/20
See application file for complete search history.

(56) References Cited

FOREIGN PATENT DOCUMENTS

| | | |
|---|---|---|
| JP | H04198385 A | 7/1992 |
| JP | H1017812 A | 1/1998 |
| JP | 2005001274 A | 1/2005 |
| JP | 201460449 A | 4/2014 |
| JP | 2017171744 A | 9/2017 |

OTHER PUBLICATIONS

Wesslau Strukturabhängige Bingschluî²reaktionen bei dervernetzenden Copolymerisation, Die Makromolekulare Chemie 93 (1966) 55-68 (Year: 1966).*
Azuma and Ogata, Photo-polymerization and -copolymerization of Aromatic Diacrylates, Polymer Journal, vol. 4, No. 6, 1973, pp. 628-636.
Narasimhaswamy et al., Synthesis and Characterization of Phenyl Acrylates Cross-Linked to Hydroquinone Diacrylate, Macromolecules, vol. 25, No. 13, 1992, pp. 3338-3344.

* cited by examiner

*Primary Examiner* — Mark S Kaucher
(74) *Attorney, Agent, or Firm* — The Webb Law Firm

(57) ABSTRACT

A polymer compound represented by formula (1). In formula (1), $R_1$ and $R_2$ each independently represent a hydrogen atom or a methyl group. In formula (1), m and n are average numbers of repeating units, and each independently represent a real number within the range of 1 to 2000. The polymer compound has sufficient flexibility to be able to form a film, exhibits high adhesion to a low roughness copper foil, and has a low dielectric constant and dielectric loss tangent.

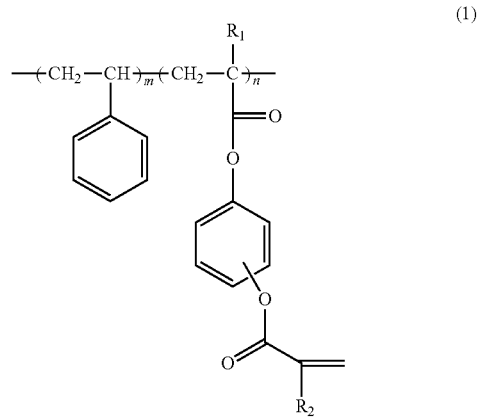

13 Claims, No Drawings

POLYMER COMPOUND, AND RESIN COMPOSITION CONTAINING SAID COMPOUND

CROSS-REFERENCE TO RELATED APPLICATIONS

This application is the United States national phase of International Application No. PCT/JP2021/024697 filed Jun. 30, 2021, and claims priority to Japanese Patent Application No. 2020-118416 filed Jul. 9, 2020, the disclosures of which are hereby incorporated by reference in their entirety

BACKGROUND OF THE INVENTION

Field of the Invention

The present invention relates to a polymer compound which can be formed into a film easily by casting the solution in a substrate, is capable of the thermosetting or the photosetting reaction by using a radical initiator together, and a cured product thereof which is excellent in dielectric property and adhesion.

Description of Related Art

The phenoxy resin is a polymer compound having a very large molecular weight and obtained by polymerizing a bifunctional epoxy resin and a bifunctional phenol compound. Because the general epoxy resin composition and the radical polymerizable composition can be formed into film shape by adding the phenoxy resin, the phenoxy resin is used as an important component of the film adhesive in a wide range of fields. Especially in the electric/electronic field, the phenoxy resin is used for the interlayer insulation layer, the copper foil with resin and the like of the printed wiring board.

The cured product of the resin composition including the phenoxy resin is excellent in adhesion and has the ability to form a film, but has low heat resistance and moreover, has high dielectric constant and high dielectric loss tangent (at the frequency of 1 GHz, the dielectric constant is about 3.5 and the dielectric loss tangent is about 0.03), therefore there is the fact that the phenoxy resin cannot be applied to the electronic equipment the response speed of which to the signal is increased recently. As a resin excellent in dielectric property, the fluorine-containing polymer compounds such as polytetrafluoroethane (PTFE) (Patent Document 1) and the liquid crystal polymer (Patent Document 2) are generally known, but these polymers have a very low compatibility with other resins and an unsatisfactory adhesion. In Patent Document 3, the curable polymer compound obtained by the esterification reaction of the aliphatic hydroxy group of the random copolymer of a monomer of equal to or less than 70 wt % having one ethylenically unsaturated group and a (meth)acrylate of equal to or more than 30 wt % having one or more aliphatic hydroxy groups with the monomer having one or more ethylenically unsaturated groups and one carboxy group is described. But when the present inventors conducted the supplementary examination, the cured product of the curable polymer compound obtained according to the constitutional formula in Document 3 had a dielectric loss tangent of about 0.005 at 10 GHz and did not satisfy the low dielectric property required for the purpose of the high-frequency circuit board of today sufficiently.

CITATION LIST

Patent Document

Patent Document 1: JP 2005-001274 A
Patent Document 2: JP 2014-060449 A
Patent Document 3: JP H10-017812 A

SUMMARY OF INVENTION

Technical Problem

One of the purposes of the present invention is to provide a curable polymer compound having sufficient flexibility to be able to form a film, exhibiting high adhesion to a low roughness copper foil and having a low dielectric constant and dielectric loss tangent.

Solution to Problem

By the earnest research, the present inventors found to solve the problems by using a resin composition containing a polymer compound having a specific structure so as to finish the present invention.

That is, the present invention relates to:

[1] A polymer compound represented by a following formula (1):

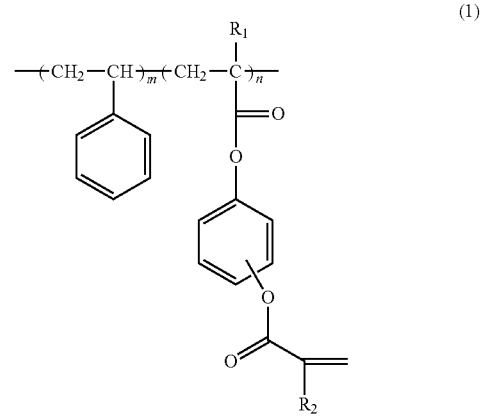

wherein in formula (1), $R_1$ and $R_2$ each independently represent a hydrogen atom or a methyl group, and wherein m and n are average numbers of repeating units and each independently represent a real number within a range of 1 to 2,000.

[2] A resin composition comprising the polymer compound according to item [1] and a radical initiator.

[3] The resin composition according to item [2] further comprising a radical reactive monomer having two or more functional groups in one molecule.

[4] The resin composition according to item [3] wherein the radical reactive monomer is a maleimide compound.

[5] A film adhesive of the resin composition according to any one of items [2] to [4].

[6] A cured product of the resin composition according to any one of items [2] to [4] or the film adhesive according to item [5].

Effects of the Invention

The polymer compound and the resin composition containing the same according to the present invention has flexibility and can be made into the cured product by using the radical initiator together and applying thermal or photo energy. The cured product of the resin composition is excellent in dielectric property, adhesion, heat resistance and water resistance.

DESCRIPTION OF THE INVENTION

One embodiment of the present invention is described below.

The polymer compound represented by above formula (1) of the present invention is the dehydrochlorinated condensate of a hydroxy group of the random copolymer of hydroxyphenyl (meth)acrylate and styrene and a chloride group of (meth)acrylic acid chloride, or a dehydrated condensate of a hydroxy group of the random copolymer described above and (meth)acrylic acid.

First, the random copolymer which is the intermediate raw material of the polymer compound of the present invention (referred to as the intermediate copolymer hereinafter) is described.

Hydroxyphenyl (meth)acrylate which is the raw material of the intermediate copolymer is not particularly limited. Examples of hydroxyphenyl (meth)acrylate include 4-hydroxyphenylmethacrylate, 2-hydroxyphenylmethacrylate, 3-hydroxyphenylmethacrylate, 4-hydroxyphenylacrylate, 2-hydroxyphenylacrylate and 3-hydroxyphenylacrylate. 4-hydroxyphenylmethacrylate is preferable.

Note that in this specification, the word "(meth)acrylate" means both of "acrylate and methacrylate".

The formula (2) described below is the structural formula of the random copolymer of hydroxyphenyl (meth)acrylate and styrene. In formula (2), $R_1$, m and n are each the same as $R_1$, m and n in formula (1). Namely, the polymer compound represented by formula (1) of the present invention (the polymer compound having the structure represented by formula (1)) is a polymer compound obtained from the intermediate raw material which is the intermediate copolymer represented by following formula (2).

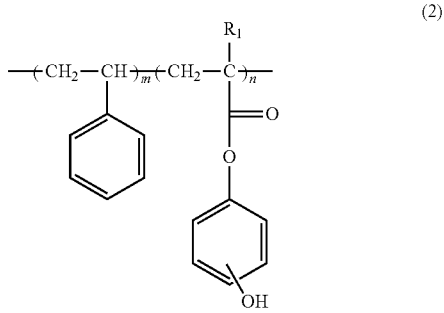

(2)

The method of the copolymerization of hydroxyphenyl (meth)acrylate and styrene is not particularly limited as long as the method is known conventionally. Examples include bulk polymerization, solution polymerization, emulsion polymerization and suspension polymerization.

Examples of the solvent usable for solution polymerization include toluene, xylene, methylethylketone, methylisobutylketone, cyclopentanone, cyclohexanone, propyleneglycolmonomethyletheracetate, N-methylpyrrolidone, N,N-dimethylformamide and γ-butyrolactone. Water and surface-active agent are generally used for emulsion polymerization and suspension polymerization. The copolymerization is carried out in the states that the raw material component is emulsified or suspended in water.

The copolymerization reaction of hydroxyphenyl (meth)acrylate and styrene may be any one of the radical polymerization, the cation polymerization and the anion polymerization. When the copolymerization reaction is the radical polymerization, the radical polymerization initiator is preferably used. Examples of the radical polymerization initiator include 2,2'-azobisisobutyronitrile, 2,2'-azobis(2-ethylbutyronitrile), 2,2'-azobis(2,4-dimethylvaleronitrile), 1,1'-azobis(cyclohexane-1-carbonitrile), 2,2'-azobis[2-(2-imidazoline-2-yl)propane]dihydrochloride, hydrogen peroxide, di-t-butylperoxide, dicumylperoxide and benzoylperoxide.

The blending amount of the radical polymerization initiator is generally 0.001 to 5 parts by mass based on 100 parts by mass of the total of the raw material components of the intermediate copolymer. The polymerization temperature is generally 50 to 250° C., preferably 60 to 200° C. The polymerization time is generally 0.5 to 30 hours, preferably 1 to 20 hours. The radical polymerization is preferably carried out under nitrogen atmosphere to prevent oxygen in the air from inhibiting the polymerization.

When the copolymerization reaction is the cation polymerization, the cation polymerization initiator is preferably used. Examples of the cation polymerization initiator include inorganic acids such as sulfuric acid and hydrochloric acid, organic acids such as $CF_3COOH$ and $CCl_3COOH$ and super-strong acids such as $CF_3SO_3H$ and $HClO_4$. When the copolymerization reaction is the anion polymerization, the anion polymerization initiator is preferably used. Examples of the anion polymerization initiator include butyl lithium, Na-naphthalene complex, alkali metal, alkyl lithium compound, sodium amide, Grignard reagent and lithium alkoxide. However, because there is concern that the ionic initiator used for the cation polymerization and the anion polymerization remains in the intermediate copolymer after polymerization reaction to affect dielectric property and insulation adversely, the intermediate copolymer which is the intermediate raw material of the polymer compound of the present invention is preferably synthesized by the radical polymerization.

The blending amount of the cation polymerization initiator or the anion polymerization initiator is generally 0.01 to 5 parts by mass based on 100 parts by mass of the total of the raw material components of the intermediate copolymer. The polymerization temperature is generally 40 to 150° C., preferably 50 to 120° C. The polymerization time is generally 0.5 to 20 hours, preferably 1 to 15 hours.

The number-average molecular weight of the intermediate copolymer of the polymer compound of the present invention is generally 3,000 to 300,000, preferably 5,000 to 200,000.

The amount of the initiator is preferably adjusted to the proper amount when synthesizing the intermediate copolymer to obtain m and n satisfying that the intermediate copolymer has the prescribed number-average molecular weight. The amount of the initiator necessary for obtaining m and n satisfying that the intermediate copolymer has the prescribed number-average molecular weight is not specified generally, because m and n also depend on the kinds of (meth)acrylate having phenolic hydroxy group and the amount of (meth)acrylate having a hydroxy group and styrene used for the copolymerization reaction. However, it is generally known that when the amount of the initiator is reduced, the intermediate copolymer having a large molecular weight is obtained. Therefore, the blending amount of the initiator should be selected within the range of the blending amount described above so as to obtain the intermediate copolymer having the desired molecular weight.

The use rates of hydroxyphenyl (meth)acrylate and styrene when synthesizing the intermediate copolymer which is the intermediate raw material of the polymer compound of the present invention are not particularly limited, but the amount (mass) of styrene is generally 4 to 99.7 times that of hydroxyphenyl (meth)acrylate by mass, preferably 4.5 to 99.5 times that of hydroxyphenyl (meth)acrylate by mass. By using the raw material of the intermediate copolymer at the rate within the range described above, the polymer compound of the present invention the cured product of which exhibits excellent dielectric property (low dielectric constant and low dielectric loss tangent) can be obtained.

The polymer compound of the present invention can be obtained by dehydrochlorinated condensation reaction of a phenolic hydroxy group of the intermediate copolymer (this hydroxy group is the hydroxy group of hydroxyphenyl (meth)acrylate which is the raw material) and a chloride group of (meth)acrylic acid chloride or dehydrated condensation reaction of a phenolic hydroxy group of the intermediate copolymer and (meth)acrylic acid.

The use rates of the intermediate copolymer and (meth) acrylic chloride or (meth)acrylic acid when synthesizing the polymer compound of the present invention are not particularly limited. However, because when the rate of (meth) acrylic acid chloride or (meth)acrylic acid is excessive or short compared to the hydroxy group of the intermediate copolymer, (meth)acrylic acid chloride or (meth)acrylic acid which remains unreacted or hydroxy group which remains unreacted with (meth)acrylic acid chloride or (meth)acrylic acid in the polymer compound may affect various characteristics of the cured product adversely. Therefore, (meth) acrylic acid chloride or (meth)acrylic acid equivalent to hydroxy group of the intermediate copolymer is preferably used.

The reaction of the intermediate copolymer with (meth) acrylic acid chloride may be carried out by adding (meth) acrylic acid chloride in the organic solvent solution of the intermediate copolymer under stirring. The organic solvent used in the reaction is not particularly limited as long as the intermediate copolymer and (meth)acrylic acid chloride can be solved in the solvent. When the intermediate copolymer is synthesized in the solvent, the intermediate copolymer solution after polymerization reaction can be used as it is. The concentration of the intermediate copolymer solution subjected to the reaction with (meth)acrylic acid chloride is generally 10 to 90% by mass, preferably 20 to 80% by mass. The reaction temperature is generally 30 to 120° C., preferably 40 to 110° C. The reaction time is generally 0.5 to 4 hours, preferably 1 to 3 hours.

Because the reaction of the intermediate copolymer with (meth)acrylic acid chloride is dehydrochlorination reaction, a tertiary amine such as triethylamine or pyridine is preferably added in advance to trap hydrochloric acid generated and accelerate the reaction further. The amount of the tertiary amine is preferably from 1 to 4 times molar that of (meth)acrylic acid chloride, more preferably from 1 to 3 times molar that of (meth)acrylic acid chloride. Hydrochloric acid generated during the reaction can be removed by filtrating after the reaction because of deposition as an amine hydrochloride. Excessive tertiary amine can be distilled off from the system by heating under reduced pressure after filtration.

Examples of the reaction of the intermediate copolymer with (meth)acrylic acid include conventionally known esterification reaction for example, the method in which the intermediate copolymer and (meth)acrylic acid are heated and stirred in the presence of the catalyst. Because the reaction of the intermediate copolymer with (meth)acrylic acid is the dehydration reaction, the reaction is preferably carried out while water is removed from the reaction system by azeotropic distillation. Therefore, the reaction is preferably carried out using the solvent which is not mixed with water completely such as toluene, xylene, ethyl acetate, butyl acetate and methylisobutylketone. The amount of the solvent is preferably given so that the concentration of the raw material of the polymer compound is 20 to 80% by mass.

Examples of the catalyst used for esterification reaction include an acid catalyst such as sulfuric acid, methanesulfonic acid and p-toluenesulfonic acid. The amount used is preferably 0.1 to 5% by mass based on the total mass of the raw material of the polymer compound, solvent and the like used for the reaction. The reaction temperature is generally 50 to 150° C., preferably 60 to 140° C. The reaction time is generally 0.5 to 4 hours, preferably 1 to 3 hours.

To prevent polymerization reaction of (meth)acryloyl groups of the polymer compound of the present invention during storage, a small amount of polymerization inhibitor is preferably added in the polymer compound solution after the synthetic reaction is finished. Examples of the polymerization inhibitor include hydroquinone, paramethoxyphenol, methylhydroquinone, di-t-butylhydroxytoluene, t-butylhydroquinone, 2-t-butyl-1,4-benzoquinone, 1,4-benzoquinone, 1,1-diphenyl-2-picrylhydrazyl free radical, 6-t-butyl-2,4-xylenol, 4-t-butylpyrocatechol, 2,6-di-t-butylphenol, 2,6-di-t-butyl-p-cresol and phenothiazine.

The range of the number average molecular weight of the polymer compound of the present invention obtained in above is preferably 11,000 to 300,000, more preferably 15,000 to 200,000. When the molecular weight is smaller than the range aforementioned, the adhesion to the low roughness copper foil sometimes is low. When the molecular weight is larger than the range aforementioned, the viscosity is high and coating and the like sometimes is difficult.

Note that the molecular weight in the present specification means the value calculated in terms of polystyrene based on the GPC measurement results.

The resin composition of the present invention contains the polymer compound of the present invention and the radical initiator.

The thermal radical initiator and/or the photo radical initiator can be used as a radical initiator. Examples of the preferable thermal radical initiator include a peroxide such as benzoylperoxide, cumenehydroperoxide, 2,5-dimethylhexane-2,5-dihydroperoxide, 2,5-dimethyl-2,5-di(t-butylperoxy) hexyne-3, di-t-butylperoxide, t-butylcumylperoxide, α,α-bis(t-butylperoxy-m-isopropyl)benzene, 2,5-dimethyl-2,5-di(t-butylperoxy)hexane, dicumylperoxide, di-t-butylperoxyisophthalate, t-butylperoxybenzoate, 2,2-bis(t-butylperoxy) butane, 2,2-bis(t-butylperoxy) octane, 2,5-dimethyl-2,5-di(benzoylperoxy)hexane, di(trimethylsilyl)peroxide and trimethylsilyltriphenylsilylperoxide.

Examples of the preferable photo radical initiator include benzoin and alkyl ether thereof such as benzoin, benzoin methyl ether and benzoin ethyl ether; acetophenone such as acetophenone, 2,2-dimethoxy-2-phenylacetophenone and 1,1-dichloroacetophenone; anthraquinone such as 2-methylanthraquinone, 2-amylanthraquinone, 2-t-butylanthraquinone and 1-chloroanthraquinone; thioxanthone such as 2,4-dimethylthioxanthone, 2,4-diisopropylthioxanthone and 2-chlorothioxanthone; ketal such as acetophenonedimethylketal and benzyldimethylketal; benzophenone such as benzophenone; 2-methyl-1-[4-(methylthio)phenyl]-2-morpholino-propane-1-one or 2-benzyl-2-dimethylamino-1-(4-morpholinophenyl)-butanone-1; acyl phosphineoxide and xanthone.

The content of the radical initiator in the resin composition of the present invention is generally 0.1 to 10 parts by mass, preferably 0.1 to 8 parts by mass based on 100 parts by mass of total of the polymer compound and the resin component such as the radical-reactive monomer which is an optional component described below.

The resin composition of the present invention may further contain the radical-reactive monomer. By using the radical-reactive monomer reactivity of the resin composition of the present invention, heat resistance of the cured product and the like can be improved. The radical-reactive monomer having two or more functional groups is preferable. Examples of the radical-reactive monomer include ethyleneglycoldimethacrylate, diethyleneglycoldimethacrylate, triethyleneglycoldimethacrylate, 1,4-butanedioldimethacrylate, neopentylglycoldimethacrylate, 1,6-hexanedioldimethacrylate, 1,9-nonanedioldimethacrylate, glycerindimethacrylate, 2-hydroxy-3-acryloyloxypropylmethacrylate, ethyleneoxide adduct methacrylate of bisphenol A trimethylolpropanetrimethacrylate, tricyclodecanedimethanoldimethacrylate, glycerindimethacrylate, trimethylolpropanetrimethacrylate, ethoxylated isocyanuric acid triacrylate, ε-caprolactone-modified tris-(2-acryloxyethyl) isocyanurate, pentaerythritoltriacrylate, ditrimethylolpropanetetraacrylate, ethoxylated pentaerythritoltetraacrylate, pentaerythritoltetraacrylate, dipentaerythritolpolyacrylate, dipentaerythritolhexaacrylate, triallylisocyanurate, triallylcyanurate, divinylbenzene, divinyl isophthalate, N-phenylmaleimide, N-phenyl-methylmaleimide, N-phenyl-chloromaleimide, N-p-chlorophenyl-maleimide, N-p-methoxyphenyl-maleimide, N-p-methylphenyl-maleimide, N-p-nitrophenyl-maleimide, N-p-phenoxyphenyl-maleimide, N-p-phenylaminophenyl-maleimide, N-p-phenoxycarbonylphenyl-maleimide, 1-maleimide-4-acetoxysuccinimide-benzene, 4-maleimide-4'-acetoxysuccinimide-diphenylmethane, 4-maleimide-4'-acetoxysuccinimide-diphenylether, 4-maleimide-4'-acetoamide-diphenylether, 2-maleimide-6-acetoamide-pyridine, 4-maleimide-4'-acetoamide-diphenylmethane, N-p-phenylcarbonylphenyl-maleimide, N-ethylmaleimide, N-2,6-xylylmaleimide, N-cyclohexylmaleimide, N-2,3-xylylmaleimide, xylylmaleimide, 2,6-xylenemaleimide and 4,4'-bismaleimidediphenylmethane. The compound having a maleimide group as a functional group (maleimide compound) is preferable.

These radical-reactive monomer may be used alone or in mixture of two or more.

The resin composition of the present invention may contain the organic solvent. Examples of the organic solvent include aromatic solvent such as toluene and xylene; ether solvent such as diethyleneglycoldimethylether, diethyleneglycoldiethylether, propyleneglycol, propyleneglycolmonomethylether, propyleneglycolmonomethylethermonoacetate and propyleneglycolmonobutylether; ketone solvent such as methylethylketone, methylisobutylketone, cyclopentanone and cyclohexanone; lactone such as γ-butylolactone and γ-valerolactone; amide solvent such as N-methylpyrrolidone (NMP), N,N-dimethylformamide (DMF), N,N-dimethylacetoamide and N,N-dimethylimidazolidinone; sulfone such as tetramethylenesulfone. The content of the organic solvent in the resin composition of the present invention is generally equal to or less than 90% by mass based on the whole amount of the resin composition, preferably 30 to 80% by mass.

The polymerization inhibitor may be used together with the resin composition of the present invention to improve storage stability. The polymerization inhibitor usable together is not particularly limited as long as it is generally well-known. Examples include quinone such as hydroquinone, methylhydroquinone, p-benzoquinone, chloranil and trimethylquinone, aromatic diol, di-t-butylhydroxytoluene.

The filler and the additive can be blended in the resin composition of the present invention as much as the original performance of the resin composition is not impaired for the purpose of giving the desired performance according to the application. The filler may be fibrous or powdery. Examples of the filler include silica, carbon black, alumina, talc, mica, glass beads and hollow glass sphere.

The flame-resistant compound, the additive and the like can be added to the resin composition of the present invention. These are not particularly limited as long as these are used generally. Examples of the flame-resistant compound include bromine compound such as 4,4-dibromobiphenyl, phosphate ester, melamine phosphate, phosphorus-containing epoxy resin, nitrogen compound such as melamine and benzoguanamine, oxazine ring-containing compound and silicon compound. Examples of the additive include ultraviolet absorber, antioxidant, photopolymerization initiator, fluorescent brightening agent, photosensitizer, dyes, pigment, thickener, lubricant, defoaming agent, dispersant, leveling agent, brightener. The additive can be used in combination according to circumstance if so desired.

The resin composition of the present invention can be used by applying on various substrate or impregnating. For example, when the thermal radical initiator is used, the resin composition can be used as the interlayer insulation layer of the multilayer printed board by applying on the PET film, as the cover lay by applying on the polyimide film and as the copper foil with resin by drying after applying on the copper foil. The resin composition can be used as the printed wiring board and the CFRP prepreg by impregnating glass cloth or glass paper, carbon fiber, a variety of nonwoven fabric and the like with the resin composition. In addition, the resin composition can be used as a variety of resist by using the photo radical initiator.

The interlayer insulation layer and the cover lay, the copper foil with resin, the prepreg and the like can be made into the cured product by applying heat and pressure with the hot press machine and the like to form.

EXAMPLES

The present invention will be explained in more detail with Examples and Comparative Examples hereinafter, but is not limit to these Examples. In Examples, the "part" means part by mass unless specified otherwise.

Example 1 (Synthesis of Polymer Compound of Present Invention)

(Step 1) Synthesis of Intermediate Copolymer Represented by Following Formula (3) (Intermediate Copolymer 1)

Into the flask provided with the thermometer, the cooling pipe, the nitrogen introducing pipe and the stirring device, 38.5 parts of styrene, 1.5 parts of 4-hydroxyphenylmethacrylate, 0.4 parts of benzoyl peroxide and 10 parts of propyleneglycolmonomethyletheracetate (PGMEA) were added and reacted under nitrogen atmosphere at 120 to 130° C. for 5 hours to obtain the PGMEA solution of the intermediate copolymer 1 represented by following formula (3). A part of the PGMEA solution described above was heated under reduced pressure to remove the solvent and the unreacted styrene. The obtained mass amount of the intermediate copolymer 1 calculated by regarding the dry mass as a solid component amount was 34.2 parts. Considering that the unreacted styrene was 5.8 parts, the intermediate copolymer 1 obtained was the copolymer of 32.7 parts of styrene and 1.5 parts of 4-hydroxyphenylmethacrylate. The number average molecular weight of the sample subjected to the measurement of the dry mass aforementioned was 38,000 and the weight average molecular weight was 161,000. The n and m in formula (3) calculated from the copolymerization ratio of styrene and 4-hydroxyphenylmethacrylate and the number average molecular weight were 361 and 9, respectively.

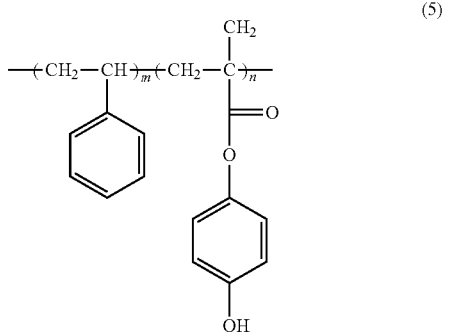

(5)

(Step 2) Synthesis of Polymer Compound of Present Invention Represented by Following Formula (4) (Polymer Compound 1)

After heating the PGMEA solution of the intermediate copolymer obtained in Step 1 under reduced pressure to distill off the unreacted styrene together with PGMEA, PGMEA was added to obtain 138 parts of the solution including 25% by mass of the intermediate copolymer 1. After adding 5 parts of triethylamine into the solution, 0.88 parts of methacrylic acid chloride was added under stirring at 60° C. and reacted for 1 hour. The reaction liquid was pressurized and filtered with filter paper which can catch the particles of size of 1 μm to remove triethylamine hydrochloride. Excessive triethylamine and PGMEA were distilled off from the filtrate by rotary evaporator. The amount of PGMEA was adjusted to obtain 139 parts of the solution containing 25% by mass of the polymer compound of the present invention represented by following formula (4) (polymer compound 1). The number average molecular weight of the polymer compound obtained was 40,000 and the weight average molecular weight was 164,000.

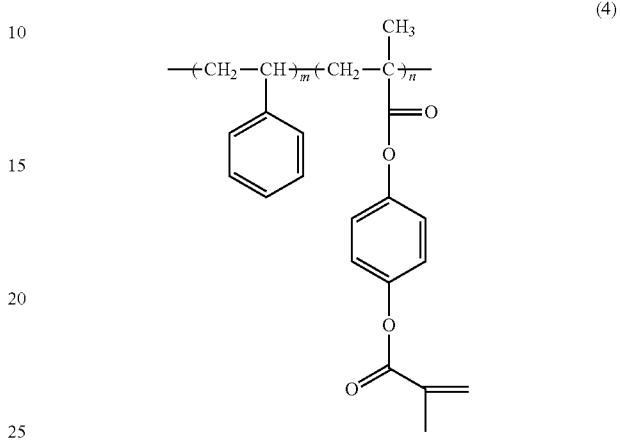

(4)

Comparative Example 1 (Synthesis of Comparative Polymer Compound Represented by Following Formula (6))

(Step 3) Synthesis of Intermediate Copolymer Represented by Following Formula (5) (Intermediate Copolymer 2)

The PGMEA solution of the intermediate copolymer 2 represented by the following formula (5) was obtained in accordance with the same step of Step 1, provided that 1.5 parts of 4-hydroxyphenylmethacrylate were replaced with 1.5 parts of 2-hydroxyethylmethacrylate. A part of the PGMEA solution aforementioned was heated under reduced pressure to remove the solvent and the unreacted styrene. The obtained mass amount of the intermediate copolymer 2 calculated by regarding the dry mass as a solid component amount was 35.6 parts. Considering that the unreacted styrene was 4.4 parts, the intermediate copolymer 2 obtained was the copolymer of 34.1 parts of styrene and 1.5 parts of 2-hydroxyethylmethacrylate. The number average molecular weight of the sample subjected to the measurement of the dry mass aforementioned was 45,000 and the weight average molecular weight was 177,000. The n and m in formula (5) calculated from the copolymerization ratio of styrene and 2-hydroxyethylmethacrylate and the number average molecular weight were 414 and 14, respectively.

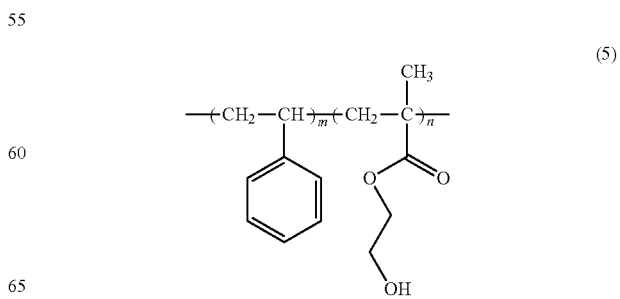

(5)

(Step 4) Synthesis of Comparative Polymer Compound Represented by Following Formula (6) (Polymer Compound 2)

145 parts of the solution containing 25% by mass of the comparative polymer compound represented by following formula (6) (polymer compound 2) was obtained in accordance with the same step of Step 2, provided that the intermediate copolymer 1 was replaced with the intermediate copolymer 2 obtained in Step 3 and that the used amount of methacrylic acid chloride was changed from 0.88 parts to 1.20 parts. The number average molecular weight of the polymer compound 2 obtained was 47,000 and the weight average molecular weight was 182,000.

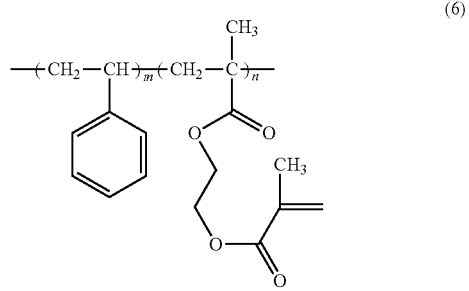

(6)

Example 2 (Preparation of Resin Composition of Present Invention)

The resin composition 1 of the present invention was obtained by adding 0.05 parts of dicumylperoxide as a radical initiator to 10 parts of the PGMEA solution of the polymer compound 1 of the present invention obtained in Example 1 and mixing homogenously.

Comparative Example 2 (Preparation of Comparative Resin Composition)

The comparative resin composition 1 was obtained in accordance with Example 2, provided that the PGMEA solution of the polymer compound 1 of the present invention was replaced with the PGMEA solution of the comparative polymer compound 1 obtained in Comparative Example 1.

(Evaluation of Dielectric Property of Cured Product of Resin Composition)

The resin composition 1 obtained in Example 2 of the present invention and the comparative resin composition 1 obtained in Comparative Example 2 were applied on the mirror surfaces of the copper foils having a thickness of 18 µm for the applied film thickness to be 280 µm by using the applicator. The copper foil having film adhesive of the resin composition was obtained by heating the resin composition at 90° C. for 10 minutes to dry the solvent. The film adhesives on the copper foils obtained above were cured by heating at 180° C. for 1 hour in the vacuum oven. Then the cured products of the film adhesives with a thickness of 70 µm which can be handled as a film were obtained by removing the copper foils by soaking the film adhesives on the copper foils in the etchant as to each resin composition. The vales of dielectric constant and dielectric loss tangent of the cured products obtained above at 10 GHz were measured by using Network analyzer 8719ET (manufactured by Agilent Technologies Japan, Ltd.) by the cavity resonance method. The results were shown in Table 1.

(Evaluation of Adhesive Strength of Cured Product of Resin Composition)

The resin composition 1 obtained in Example 2 of the present invention and the comparative resin composition 1 obtained in Comparative Example 2 were applied on the matted surface of the high frequency low roughness copper foil with a thickness of 12 µm (CF-T4X-SV: manufactured by FUKUDA METAL FOIL & POWDER Co., Ltd.) by using the applicator for the applied film thickness to be 50 µm respectively. The copper foils having film adhesives of the resin compositions were obtained by heating the resin compositions at 90° C. for 10 minutes to dry the solvent. Onto the adhesive application surfaces of the copper foils with the resins obtained above, the matted surface of the same copper foil as above was put and subjected to heat and the pressure of 3 MPa in the vacuum pressing apparatus for 1 hour to cure. Then the 90° peeling strength between the copper foils (adhesive strength) was measured by using Autograph AGX-50 (manufactured by Shimazu Corporation). The result was shown in Table 1.

TABLE 1

| [Evaluation result of cured product of resin composition] | | |
|---|---|---|
| Resin composition | Example 2 | Comparative Example 2 |
| Dielectric constant [10 GHz] | 2.40 | 2.53 |
| Dielectric loss tangent[10 GHz] | 0.00126 | 0.00476 |
| Adhesive strength [N/mm] | 0.65 | 0.54 |

AS seen in the above, when the polymer compound of the present invention is cured by using the radical initiator, the flexible film can be formed, and furthermore excellent dielectric properties and adhesive were exhibited.

The invention claimed is:

1. A polymer compound represented by a following formula (1):

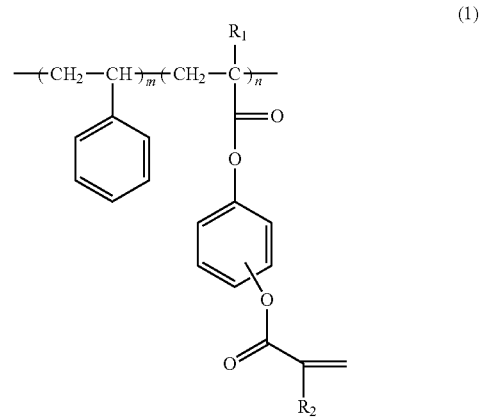

(1)

wherein in formula (1), $R_1$ and $R_2$ each independently represent a hydrogen atom or a methyl group, and wherein m and n are average numbers of repeating units and each independently represent a real number within the range of 1 to 2,000,
wherein the polymer compound has a number average molecular weight of 11,000 to 300,000.

2. A resin composition comprising the polymer compound according to claim 1 and a radical initiator.

3. The resin composition according to claim 2, further comprising a radical reactive monomer having two or more functional groups in one molecule.

4. The resin composition according to claim 3, wherein the radical reactive monomer is a maleimide compound.

5. A film adhesive of the resin composition according to claim 2.

6. A film adhesive of the resin composition according to claim 3.

7. A film adhesive of the resin composition according to claim 4.

8. A cured product of the resin composition according to claim 2.

9. A cured product of the resin composition according to claim 3.

10. A cured product of the resin composition according to claim 4.

11. A cured product of the film adhesive according to claim 5.

12. A cured product of the film adhesive according to claim 6.

13. A cured product of the film adhesive according to claim 7.

* * * * *